United States Patent
Shachar et al.

(10) Patent No.: US 11,693,934 B2
(45) Date of Patent: Jul. 4, 2023

(54) DEVICE PROTECTION USING CONFIGURATION LOCKDOWN MODE

(71) Applicant: EMC IP Holding Company LLC, Hopkinton, MA (US)

(72) Inventors: Tomer Shachar, Omer (IL); Yevgeni Gehtman, Modi'in (IL); Maxim Balin, Gan Yavne (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/105,747

(22) Filed: Nov. 27, 2020

(65) Prior Publication Data

US 2022/0171833 A1    Jun. 2, 2022

(51) Int. Cl.
  *G06F 21/30*    (2013.01)
  *H04L 41/0813*  (2022.01)

(52) U.S. Cl.
  CPC .......... *G06F 21/30* (2013.01); *H04L 41/0813* (2013.01)

(58) Field of Classification Search
  CPC .............................. G06F 21/30; H04L 41/0813
  See application file for complete search history.

(56) References Cited

U.S. PATENT DOCUMENTS

| 10,289,783 | B1 | 5/2019 | Khanna et al. | |
| 2014/0157360 | A1* | 6/2014 | Ross | H04L 63/105 726/1 |
| 2016/0087956 | A1* | 3/2016 | Maheshwari | H04W 4/50 726/6 |
| 2017/0142124 | A1* | 5/2017 | Mukhin | G06F 21/30 |
| 2017/0223230 | A1* | 8/2017 | Bunker | H04N 1/4426 |
| 2018/0288126 | A1* | 10/2018 | Smart | H04L 43/028 |
| 2019/0065786 | A1* | 2/2019 | Young | H04L 9/3247 |
| 2020/0034541 | A1* | 1/2020 | Ballard | G06F 8/654 |
| 2020/0351293 | A1* | 11/2020 | Ponnuru | H04L 63/1433 |
| 2020/0394859 | A1* | 12/2020 | Trapani | G07C 9/00571 |
| 2021/0150034 | A1* | 5/2021 | Rose | H04L 63/1433 |

OTHER PUBLICATIONS https://kb.vmware.com/s/article/1 008077 , Feb. 14, 2020.
https://www.itprotoday.com/web-application-management/aspnet-20-configuration-lockdown, Oct. 30, 2009.
https://docs.microsoft.com/en-us/windows/configuration/mobile-devices/settings-that-can-be-locked-down, Jul. 27, 2017.

* cited by examiner

*Primary Examiner* — Tongoc Tran
(74) *Attorney, Agent, or Firm* — Ryan, Mason & Lewis, LLP (57) ABSTRACT

Techniques are provided for device protection using a configuration lockdown mode. One method comprises receiving a configuration command from a user for a device; determining, responsive to receiving the configuration command, if the device is in a configuration lockdown mode that limits an execution of one or more configuration commands; and performing one or more automated remedial actions in response to determining that the device is in the configuration lockdown mode, such as generating a configuration lockdown alert. A configuration manager associated with the device may (i) determine if a duration of a disabling of the configuration lockdown mode violates one or more duration limits, and/or (ii) determine if the device is in the configuration lockdown mode.

20 Claims, 8 Drawing Sheets

DEVICE PROTECTION USING CONFIGURATION LOCKDOWN MODE

FIELD

The field relates generally to information processing systems, and more particularly to the protection of such information processing systems.

BACKGROUND

A computer network is typically configured to incorporate security functionality to protect the devices of the network against malicious activity. For example, it may be desirable to prevent suspicious computer operations unless they are implemented by a legitimate and authorized user. Currently, role-based access control (RBAC) techniques are often employed to restrict access to devices or network resources based on the roles of individual users within an organization, such as an enterprise. Typically, RBAC techniques allow users to access only the information and/or devices needed for their jobs and prevent users from accessing other information and/or devices. RBAC techniques, however, are vulnerable to various types of attacks, such as password theft and/or session hijacking.

A need exists for improved techniques for protecting devices from suspicious or unauthorized computer operations.

SUMMARY

In one embodiment, a method comprises receiving a configuration command from a user for a device; determining, responsive to receiving the configuration command, if the device is in a configuration lockdown mode that limits an execution of one or more configuration commands; and performing one or more automated remedial actions in response to determining that the device is in the configuration lockdown mode, such as generating a configuration lockdown alert.

In some embodiments, a configuration manager associated with the device (i) determines if a duration of a disabling of the configuration lockdown mode violates one or more duration limits, and/or (ii) determines if the device is in the configuration lockdown mode.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for device protection using a configuration lockdown mode.

In one or more embodiments, the disclosed techniques for device protection allow selectively enabling (and disabling) a given protected device in a configuration lockdown mode. When in a configuration lockdown mode, only authorized users can execute configuration commands, such as installing new software patches, editing users, changing a network configuration, changing a firewall configuration or any changes to a baseline of a storage system or other protected devices. In an exemplary storage system implementation, for example, other users are limited in a configuration lockdown mode to, for example, reading and/or writing data and reading defined configuration settings.

While one or more embodiments of the disclosure are illustrated in the context of protecting storage devices, the disclosed device protection techniques may be implemented to protect any types of devices, as would be apparent to a person of ordinary skill in the art.

Figure 1A:
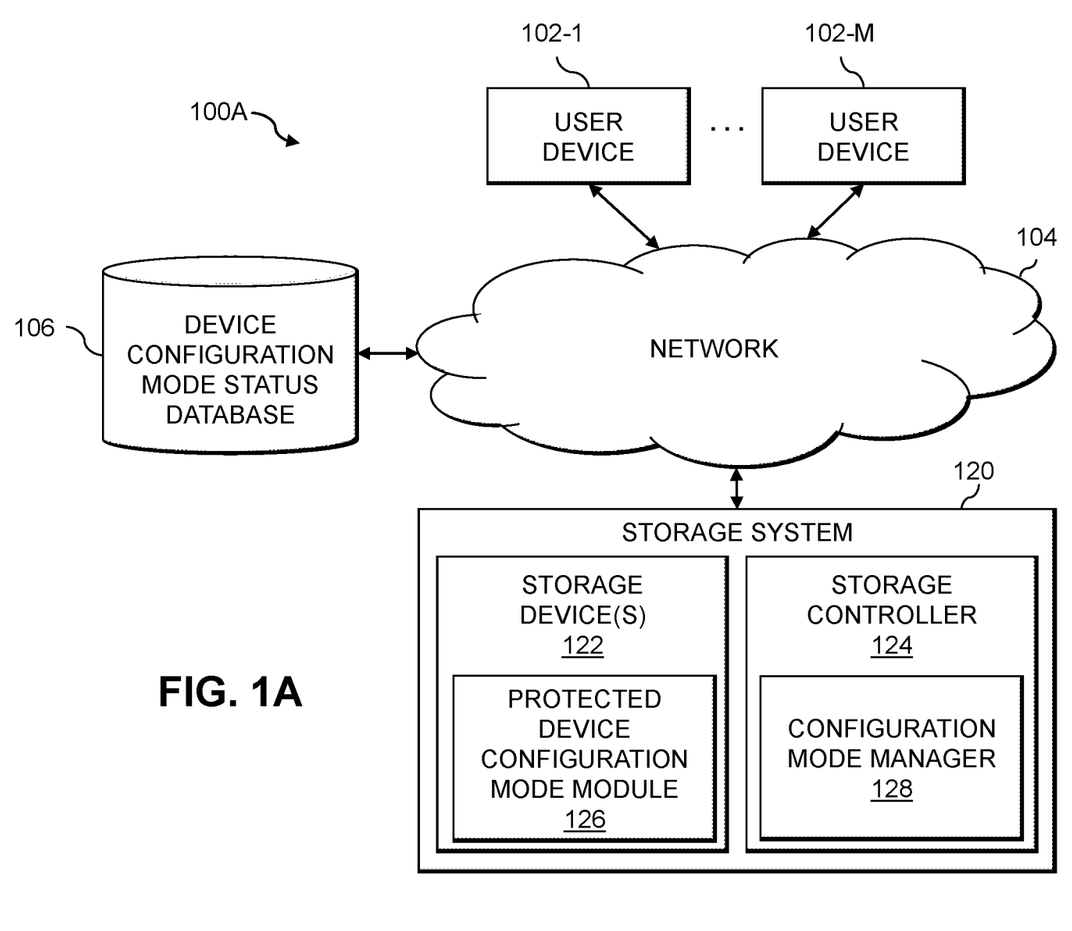
FIGS. 1A and 1B illustrate computer networks configured for device protection using a configuration lockdown mode in accordance with illustrative embodiments.
Figure 1B:
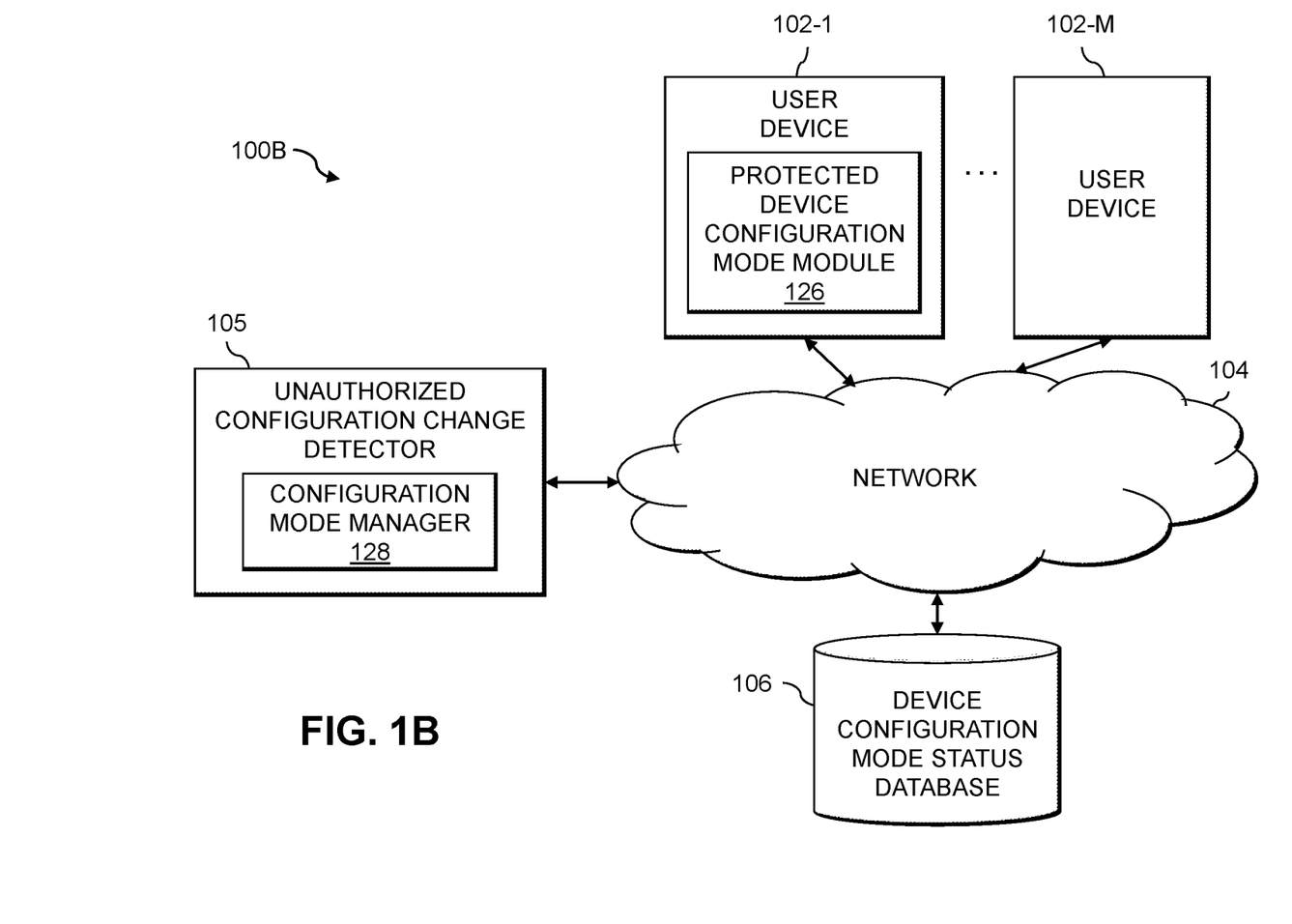

FIGS. 1A and 1B illustrate computer networks (also referred to herein as an information processing system) 100A, 100B, respectively, configured for device protection using a configuration lockdown mode in accordance with illustrative embodiments. FIG. 1A illustrates the computer network 100A configured for protection of one or more storage devices 122 using the configuration lockdown mode in accordance with one illustrative embodiment. FIG. 1B illustrates the computer network 100B configured for protection of one or more user devices 102 using the configuration lockdown mode in accordance with another illustrative embodiment of the disclosure. The elements of FIGS. 1A and 1B having the same element label numbers are implemented in a substantially similar manner in both figures, unless otherwise indicated. In the following discussion, computer networks 100A and 100B are collectively referred to as computer network 100, unless otherwise indicated.

The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1A and FIG. 1B embodiments. Also coupled to network 104 in the embodiment of FIG. 1A is a device configuration mode status database 106, and a storage system 120. In the embodiment of FIG. 1B, an unauthorized configuration change detector 105 is also coupled to network 104.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by the storage system 120. The term "input-output" as used herein refers to at least one of input and output. For example, IO operations may comprise write requests and/or read requests directed to logical addresses of a particular logical storage volume of the storage system 120. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage system 120 illustratively comprises processing devices of one or more processing platforms. For example, the storage system 120 can comprise one or more processing devices each having a processor and a memory, possibly implementing virtual machines and/or containers, although numerous other configurations are possible.

The storage system 120 can additionally or alternatively be part of cloud infrastructure such as an Amazon Web Services (AWS) system. Other examples of cloud-based systems that can be used to provide at least portions of the storage system 120 include Google Cloud Platform (GCP) and Microsoft Azure.

The user devices 102 and the storage system 120 may be implemented on a common processing platform, or on separate processing platforms. The user devices 102 (for example, when implemented as host devices) are illustratively configured to write data to and read data from the storage system 120 in accordance with applications executing on those host devices for system users.

The storage system 120 comprises a plurality of storage devices 122 and an associated storage controller 124. The storage devices 122 store data of a plurality of storage volumes, such as respective logical units (LUNs) or other types of logical storage volumes. The term "storage volume" as used herein is intended to be broadly construed, and should not be viewed as being limited to any particular format or configuration.

The storage devices 122 of the storage system 120 illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated that numerous different types of storage devices 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In the embodiment of FIG. 1A, one or more of the storage devices 122 are protected using the disclosed device protection techniques. As shown in FIG. 1A, the exemplary protected storage device 122 comprises a protected device configuration mode module 126. In addition, the storage controller 124 comprises a configuration mode manager 128 that manages the configuration mode for multiple storage devices 122.

In the embodiment of FIG. 1B, one or more of the user devices 102 are protected using the disclosed device protection techniques. As shown in FIG. 1B, the exemplary protected user device 102-1 comprises a protected device configuration mode module 126. In addition, the unauthorized configuration change detector 105 (e.g., a server) comprises a configuration mode manager 128 that manages the configuration mode for multiple user devices 102 or other devices, including storage devices 122 in at least some embodiments.

In some embodiments, communications between one or more of the devices in the computer network 100 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the storage system 120 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with the storage system 120 and/or unauthorized configuration change detector 105. Such interaction illustratively includes generating IO operations, such as write and read requests, and sending such requests over the network 104 for processing by the storage system 120 and/or unauthorized configuration change detector 105. In some embodiments, each of the user devices 102 comprises a multi-path input-output (MPIO) driver configured to control delivery of IO operations from the host device to the storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 120. The MPIO driver may comprise, for example, an otherwise conventional MPIO driver, such as a PowerPath® driver from Dell EMC. Other types of MPIO drivers from other driver vendors may be used.

The storage controller 124 and the storage system 120 may further include one or more additional modules and other components typically found in conventional implementations of storage controllers and storage systems, although such additional modules and other components are omitted from the figure for clarity and simplicity of illustration.

The storage system 120 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 120 in such an embodiment collectively comprise at least a portion of the storage controller 124 of the storage system 120. For example, in some embodiments the sets of processing modules of the storage nodes collectively comprise a distributed storage controller of the distributed storage system 120. A "distributed storage system" as that term is broadly used herein is intended to encompass any storage system that, like the storage system 120, is distributed across multiple storage nodes.

It is assumed in some embodiments that the processing modules of a distributed implementation of storage controller 124 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

Each storage node of a distributed implementation of storage system 120 illustratively comprises a CPU or other type of processor, a memory, a network interface card (NIC) or other type of network interface, and a subset of the storage devices 122, possibly arranged as part of a disk array enclosure (DAE) of the storage node. These and other references to "disks" herein are intended to refer generally to storage devices, including SSDs, and should therefore not be viewed as limited to spinning magnetic media.

The storage system 120 in the FIG. 1A embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the storage system 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the storage system 120 to reside in different data centers. Numerous other distributed implementations of the user devices and the storage system 120 are possible.

The unauthorized configuration change detector 105 of FIG. 1B further comprises a configuration mode manager 128 to protect one or more user devices 102. As discussed hereinafter, the configuration mode manager 128 manages the disclosed techniques for device protection using a configuration lockdown mode for one or more user devices 102, as would be apparent to a person of ordinary skill in the art.

It is to be appreciated that the particular arrangement of the protected device configuration mode module 126 and the configuration mode manager 128 in the embodiments of FIG. 1A and FIG. 1B are presented by way of example only, and alternative arrangements can be used in other embodiments. For example, the functionality associated with the protected device configuration mode module 126 and the configuration mode manager 128 in other embodiments can be combined into a single module, or separated across a larger number of modules. As another example, multiple distinct processors and/or memory elements can be used to implement different ones of the protected device configuration mode module 126 and the configuration mode manager 128 or portions thereof. At least portions of the protected device configuration mode module 126 and the configuration mode manager 128 may be implemented at least in part in the form of software that is stored in memory and executed by a processor.

It is further noted that the functionality of unauthorized configuration change detector 105 of the FIG. 1B embodiment or portions thereof may be implemented by one or more of the user devices 102 and/or the storage controller 124 of FIG. 1A in other embodiments, as would be apparent to a person of ordinary skill in the art.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using interne protocol (IP) or other related communication protocols.

Additionally, the configuration mode manager 128 can have an associated device configuration mode status database 106 configured to store configuration mode status pertaining to each protected device, such as storage device 122 (FIG. 1A) and/or user device 102-1 (FIG. 1B), using the disclosed device protection techniques.

The device configuration mode status database 106 in the present embodiment is implemented using one or more storage systems 120, for example, associated with the unauthorized configuration change detector 105 of FIG. 1B. Such storage systems can comprise any of a variety of different types of storage including NAS, SANs, DAS and distributed DAS, as well as combinations of these and other storage types, including software-defined storage.

Also associated with the unauthorized configuration change detector 105 can be one or more input-output devices (not shown), which illustratively comprise keyboards, displays or other types of input-output devices in any combination. Such input-output devices can be used, for example, to support one or more user interfaces to the unauthorized configuration change detector 105, as well as to support communication between the unauthorized configuration change detector 105 and other related systems and devices not explicitly shown.

The unauthorized configuration change detector 105 in the FIG. 1B embodiment is assumed to be implemented using at least one processing device. Each such processing device generally comprises at least one processor and an associated memory, and implements one or more functional modules for controlling certain features of the unauthorized configuration change detector 105. More particularly, unauthorized configuration change detector 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface allows the user devices 102 and/or the unauthorized configuration change detector 105 to communicate over the network 104 with each other (as well as one or more other networked devices), and illustratively comprises one or more conventional transceivers.

It is to be understood that the particular set of elements shown in FIGS. 1A and 1B for device protection using a configuration lockdown mode is presented by way of illustrative example only, and in other embodiments additional or alternative elements may be used. Thus, another embodiment includes additional or alternative systems, devices and other network entities, as well as different arrangements of modules and other components.

An exemplary process utilizing the protected device configuration mode module 126 and configuration mode manager 128 in computer network 100 will be described in more detail with reference, for example, to the flow diagrams of FIGS. 2 through 5.

Figure 2:
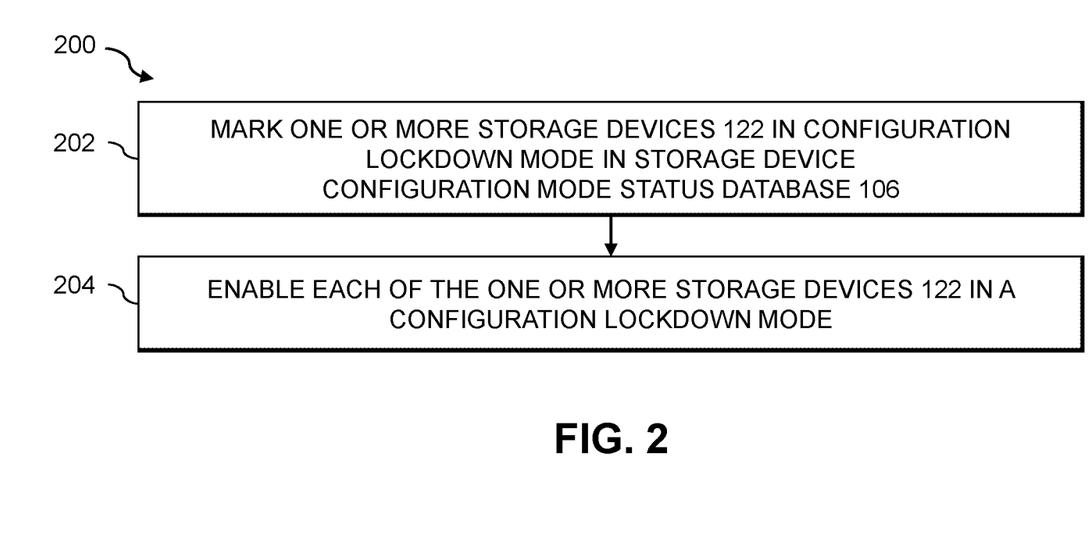
FIGS. 2 through 5 are flow diagrams illustrating exemplary implementations of device protection processes using a configuration lockdown mode, according to one embodiment of the disclosure.

FIG. 2 is a flow diagram illustrating an exemplary implementation of a configuration lockdown mode enable process 200, according to at least one embodiment of the disclosure. The exemplary configuration lockdown mode enable process 200 may be implemented, for example, by the configuration mode manager 128 in the embodiments of FIGS. 1A and/or 1B. As shown in FIG. 2, the exemplary configuration lockdown mode enable process 200 initially marks one or more storage devices 122 in a configuration lockdown mode in the storage device configuration mode status database 106 in step 202. Thereafter, each of the one or more storage devices 122 are enabled in a configuration lockdown mode in step 204. In some embodiments, a system may be automatically placed in a configuration lockdown mode, by default.

Figure 3:
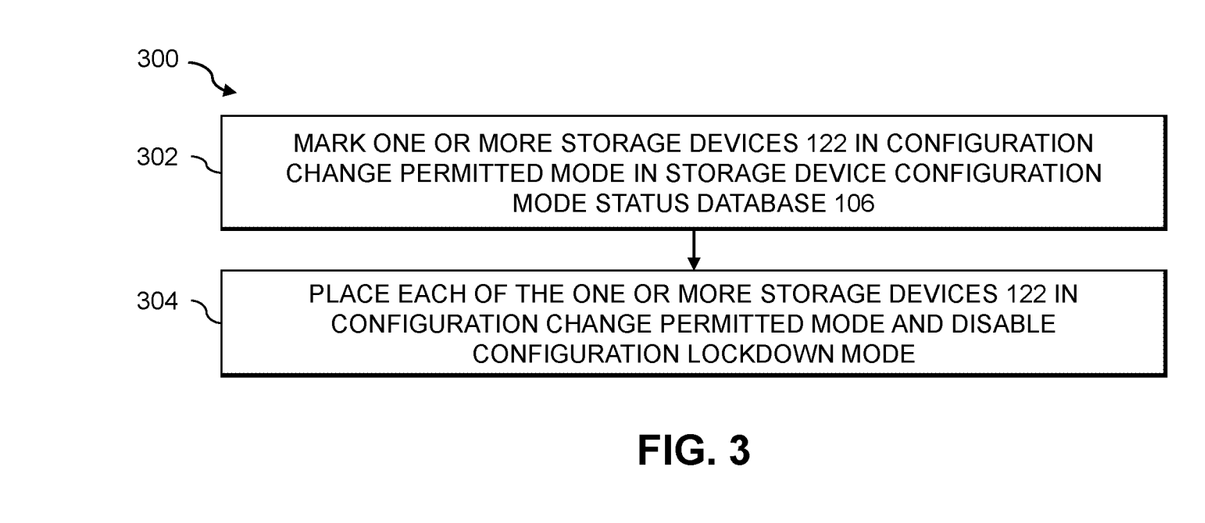

FIG. 3 is a flow diagram illustrating an exemplary implementation of a configuration lockdown mode disable process 300, according to one or more embodiments. The exemplary configuration lockdown mode disable process 300 may be implemented, for example, by the configuration mode manager 128 in the embodiments of FIGS. 1A and/or 1B. In at least some embodiments, only specifically authorized users (such as appropriate administrators) will be authorized to execute the exemplary configuration lockdown mode disable process 300 that allows a configuration lockdown mode to be disabled (and potentially exposes a system and/or device to configuration changes by one or more configuration commands).

As shown in FIG. 3, the exemplary configuration lockdown mode disable process 300 initially marks one or more storage devices 122 in a configuration change permitted mode in storage device configuration mode status database 106 in step 302. Thereafter, each of the one or more storage devices 122 are placed in a configuration change permitted mode (and configuration lockdown mode disabled) in step 304.

Figure 4:
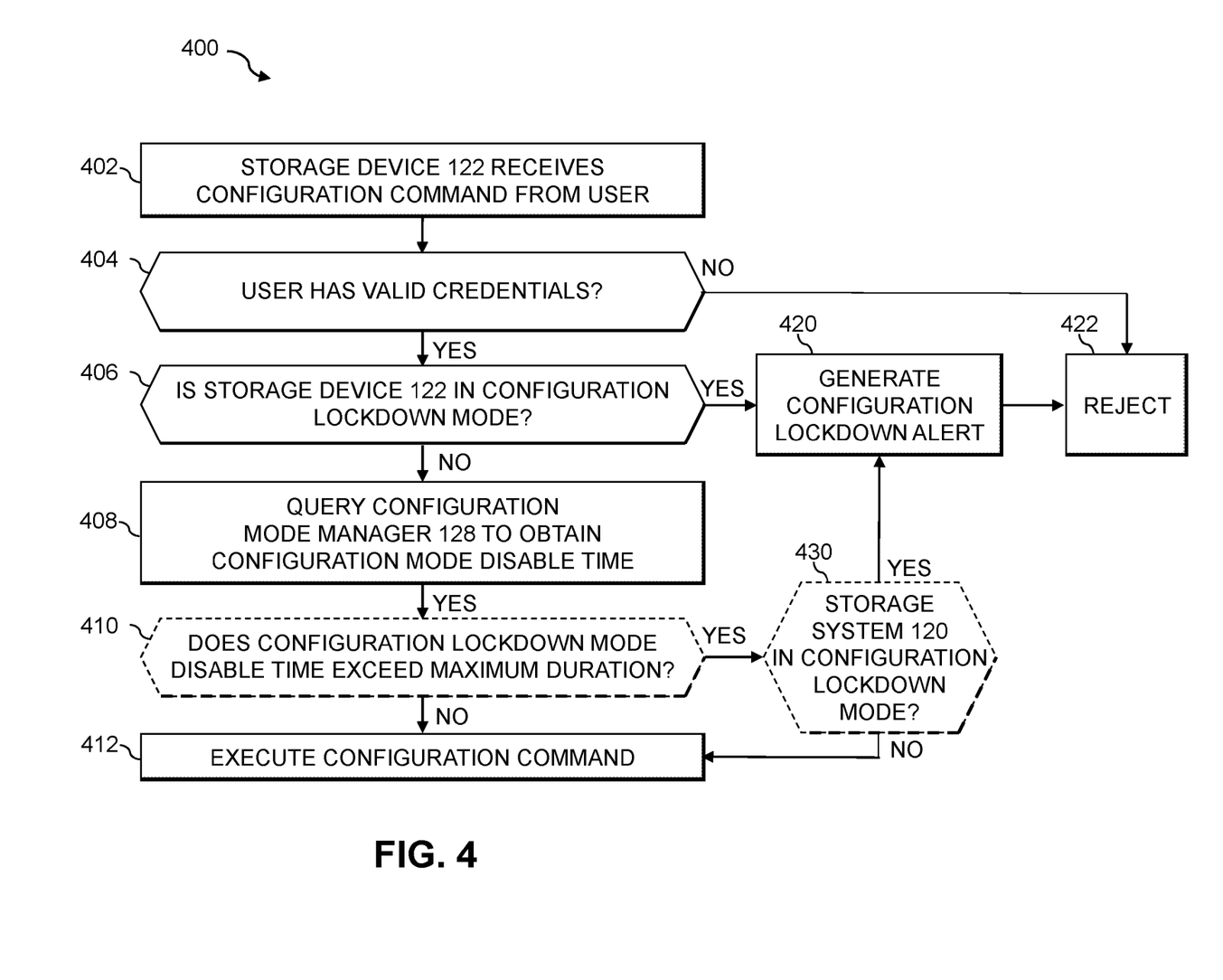

FIG. 4 is a flow diagram illustrating an exemplary implementation of a device protection process 400 using a configuration lockdown mode, according to one embodiment of the disclosure. As discussed hereinafter, in the example of FIG. 4, the device protection process 400 is performed by a combination of the protected device configuration mode module 126 and the configuration mode manager 128. For example, those steps in FIG. 4 with a dashed outline are performed in at least some embodiments, by the configuration mode manager 128, and the other steps of FIG. 4 are performed by the protected device configuration mode module 126 in the protected device.

As shown in FIG. 4, in step 402, the storage device 122 receives a configuration command from user in connection with the storage device or another protected device (e.g., the user device 102-1 of FIG. 1B). It is assumed in the following discussion of FIG. 4 that the protected device is storage device 122.

A test is performed in step 404 to determine if the user has valid credentials. The test may also evaluate whether the user is authorized for this type of configuration command. If it is determined in step 404 that the user does not have valid credentials (or is not authorized for this command type), then the requested configuration command is rejected in step 422.

If it is determined in step 404 that the user has valid credentials and is authorized for this command type, then a further test is performed in step 406 to determine if the storage device 122 is in a configuration lockdown mode. If it is determined in step 406 that the storage device 122 is in a configuration lockdown mode, then a configuration lockdown alert is generated in step 420 and then the requested configuration command is rejected in step 422.

If it is determined in step 406 that the storage device 122 is not in a configuration lockdown mode, then the device protection process 400 queries the configuration mode manager 128 in step 408 to obtain a configuration mode disable time (e.g., how long is the disabled status for the current configuration lockdown mode).

A test is performed in step 410 to determine if the configuration lockdown mode disable time exceeds a specified maximum duration. If it is determined in step 410 that the configuration lockdown mode disable time exceeds the specified maximum duration, then a further test is performed in step 430 to determine if storage system 120 is in a configuration lockdown mode. For example, the test may determine if the entire system is in a configuration lockdown mode. In at least some embodiments, for a system-wide configuration lockdown mode, each storage device in the storage system (or each device in another system) inherits the lockdown status. By default, all storage devices 122 may be in a lockdown mode. An administrator can selectively disable a lockdown mode on a specific system in some embodiments to implement changes.

If it is determined in step 430 that the storage device 122 is in a configuration lockdown mode, then an alert is generated in step 420 and program control proceeds as outlined above.

If it is determined in step 410 that the configuration lockdown mode disable time does not exceed the specified maximum duration, or if it is determined in step 430 that storage device 122 is not in a configuration lockdown mode, then the configuration command is executed in step 412.

Figure 5:
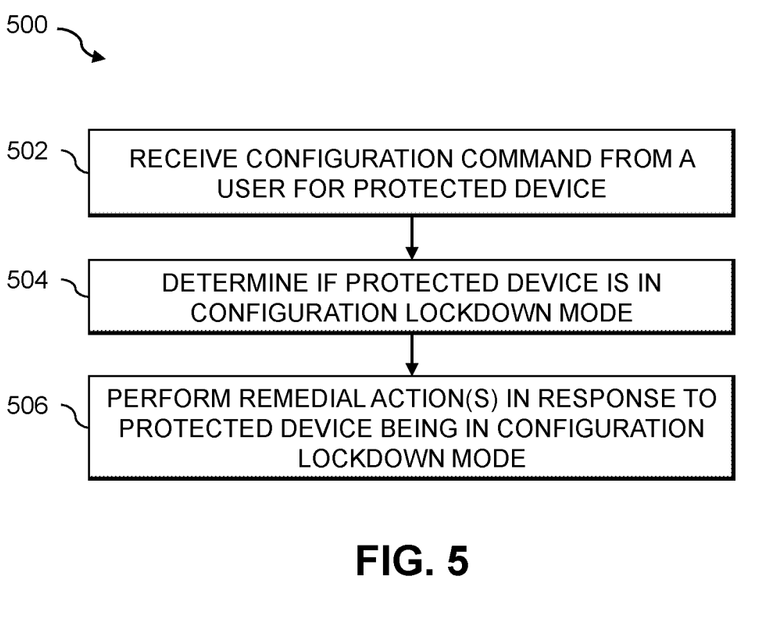

FIG. 5 is a flow diagram illustrating an exemplary implementation of a device protection process 500 using a configuration lockdown mode, according to an embodiment. As discussed hereinafter, in the example of FIG. 5, the device protection process 500 is performed by the protected device configuration mode module 126 of a given protected device, such as the storage device 122 (FIG. 1A) or the user device 102-1 (FIG. 1B).

In the example of FIG. 5, the device protection process 500 receives (e.g., by the protected device) a configuration command in step 502 from a user for the protected device. In step 504, the device protection process 500 determines (e.g., responsive to receiving the configuration command) if the protected device is in a configuration lockdown mode that limits an execution of one or more configuration commands. In step 506, the device protection process 500 performs one or more automated remedial actions, such as generating a configuration lockdown alert, in response to determining that the protected device is in the configuration lockdown mode.

In at least some embodiments of the device protection process 500, the configuration command is executed in response to determining that the device is not in the configuration lockdown mode. The configuration mode manager 128 may determine if a duration of a disabling of the configuration lockdown mode violates one or more duration limits. In addition, the configuration mode manager 128 may further determine if the device is in the configuration lockdown mode, for example, as part of a system-wide configuration lockdown mode.

The particular processing operations and other network functionality described in conjunction with the flow diagrams of FIGS. 2 through 5 are presented by way of illustrative example only, and should not be construed as limiting the scope of the disclosure in any way. Alternative embodiments can use other types of processing operations for device protection using a configuration lockdown mode. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Upon detection of an anomaly with respect to a protected device (e.g., an unauthorized attempt to reconfigure the protected device when the protected device is in a configuration lockdown mode), the protected device configuration mode module 126 and/or the configuration mode manager 128, for example, can optionally initiate or execute one or more predefined remedial steps and/or mitigation steps to address the detected anomalies. For example, the predefined remedial steps and/or mitigation steps to address the detected anomalies may comprise the transmission of an alert or alarm to the user device 102 and/or user for important or suspicious events; isolating, removing, quarantining, limiting permissions, analyzing, and deactivating the protected device, one or more of the user devices 102 and/or one or more files, accounts or aspects of the protected device, user devices 102 or the user; notifying one or more third party systems (such as sending an email, or generating an alert in another system); restricting access of one or more accounts and one or more machines or services from accessing a network, files or folders; initiating a step-up authentication with one or more additional authentication factors; resetting or limiting permissions associated with a file or folder; quarantining one or more files or folders, and preventing one or more further actions from being executed associated with the protected device, user devices 102, user account, service or machine associated with the detected anomalous activity.

In this manner, when an unauthorized and/or malicious configuration change is detected for a given protected hardware device, the appropriate parties can be notified to immediately respond to the potential attack and further security breaches with the protected hardware device can be mitigated. The impacted protected hardware device can optionally be disabled from further operation or otherwise shutdown to prevent the reconfigured protected device from harming data and/or network environment of the customer.

Among other benefits, the disclosed techniques for device protection using a configuration lockdown mode provide an additional security layer (e.g., for configuration command execution via a command line interface) that controls any changes to a protected device with new seamless security boundaries associated with the configuration lockdown mode for day-to-day tasks by authorized users, but create hard-to-break barriers for a potential attacker.

When a protected device is in a configuration lockdown mode, the only way to connect and manage the protected device is using the configuration mode manager 128. The system will protect itself by denying access in case you want to connect directly to the protected device.

One or more embodiments of the disclosure provide improved methods, apparatus and computer program products for device protection using a configuration lockdown mode. The foregoing applications and associated embodiments should be considered as illustrative only, and numerous other embodiments can be configured using the techniques disclosed herein, in a wide variety of different applications.

It should also be understood that the disclosed device protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device protection using a configuration lockdown mode may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a Function-as-a-Service FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based device protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based device protection engine platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
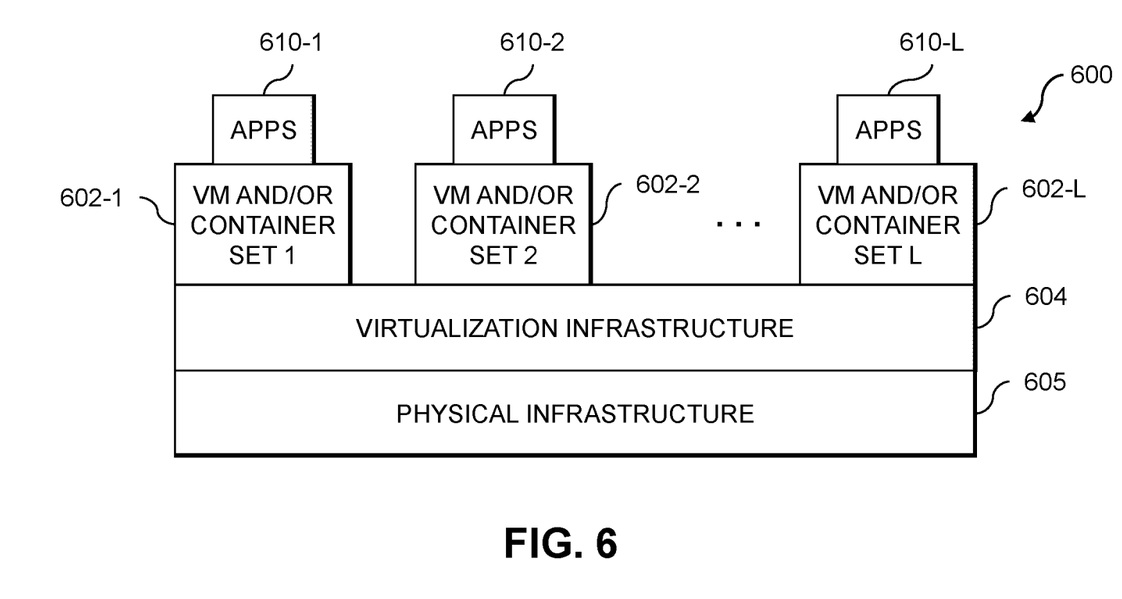
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide device protection functionality of the type described above for one or more processes running on a given one of the VMs. For example, each of the VMs can implement device protection control logic and associated device configuration mode status update functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide device protection functionality of the type described above for one or more processes running on different ones of the containers. For example, a container host device supporting multiple containers of one or more container sets can implement one or more instances of device protection control logic and associated device configuration mode status update functionality for device protection.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
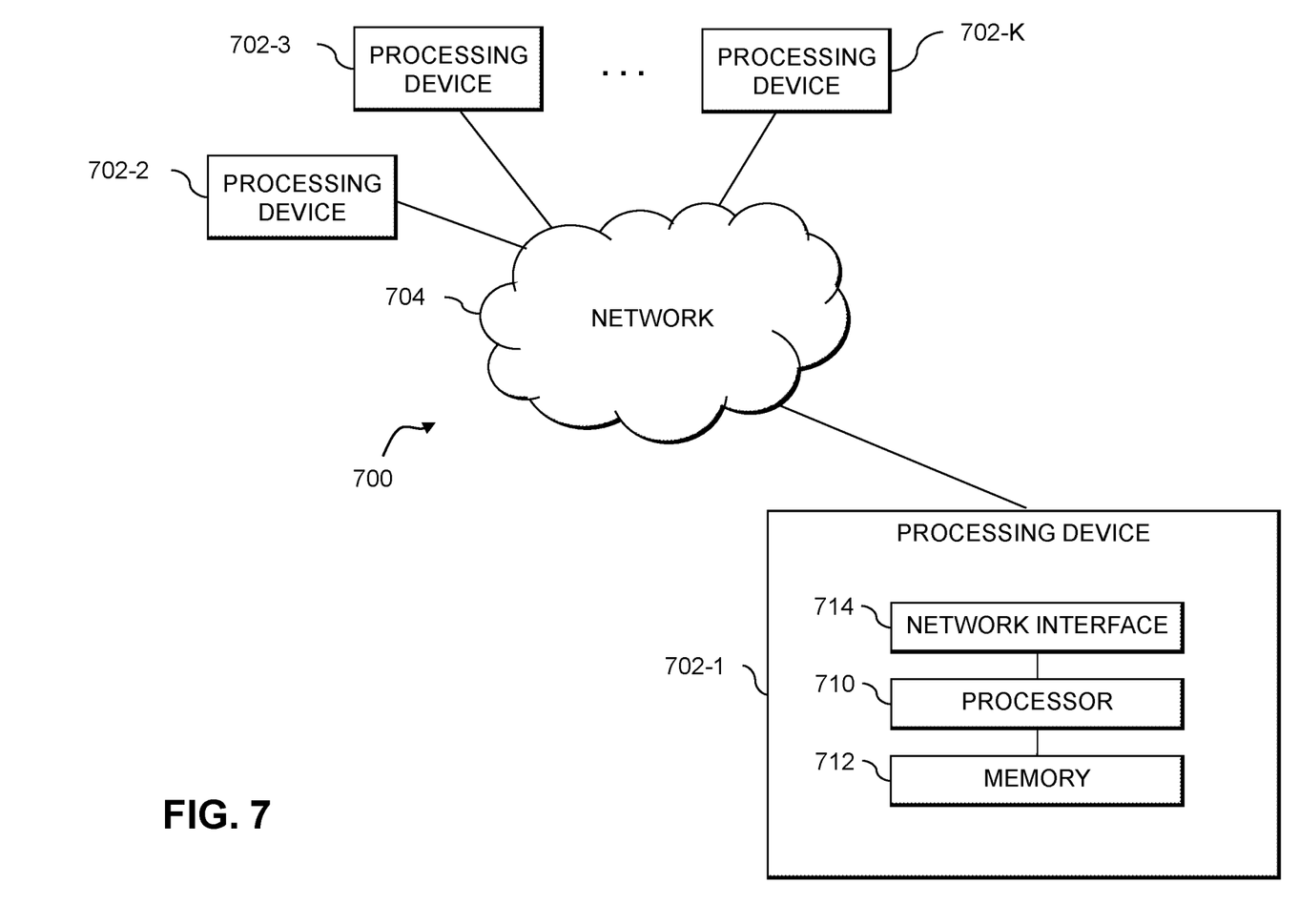
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving a configuration command from a user to modify a configuration of at least a portion of a device;
   in response to receiving the configuration command, performing the following steps:
   determining whether the device is in a configuration lockdown mode that limits an execution of one or more configuration commands, wherein the received configuration command is distinct from a command to enable the configuration lockdown mode, wherein a duration of a disabling of the configuration lockdown mode is limited by one or more duration limits;
   executing the received configuration command in response to determining that the device is not in the configuration lockdown mode and that the one or more duration limits are not violated; and
   performing one or more automated actions and rejecting the received configuration command in response to determining that the device is in the configuration lockdown mode;
   wherein the method is performed by at least one processing device comprising a processor coupled to a memory.

2. The method of claim 1, further comprising querying a configuration manager associated with the device to obtain the one or more duration limits for the configuration lockdown mode.

3. The method of claim 1, further comprising determining, by a configuration manager associated with the device, if the device is in the configuration lockdown mode.

4. The method of claim 1, wherein the one or more automated actions comprise one or more of generating a configuration lockdown alert and disabling the device.

5. The method of claim 1, wherein the configuration lockdown mode is selectively enabled and disabled.

6. The method of claim 2, further comprising evaluating credentials of the user.

7. The method of claim 1, further comprising evaluating permissions of the user to execute the configuration command.

8. An apparatus comprising:
   at least one processing device comprising a processor coupled to a memory;
   the at least one processing device being configured to implement the following steps:
   receiving a configuration command from a user to modify a configuration of at least a portion of a device;
   in response to receiving the configuration command, performing the following steps:
   determining whether the device is in a configuration lockdown mode that limits an execution of one or more configuration commands, wherein the received configuration command is distinct from a command to enable the configuration lockdown mode, wherein a duration of a disabling of the configuration lockdown mode is limited by one or more duration limits;
   executing the received configuration command in response to determining that the device is not in the configuration lockdown mode and that the one or more duration limits are not violated; and
   performing one or more automated actions and rejecting the received configuration command in response to determining that the device is in the configuration lockdown mode.

9. The apparatus of claim 8, further comprising querying a configuration manager associated with the device to obtain the one or more duration limits for the configuration lockdown mode.

10. The apparatus of claim 8, further comprising determining, by a configuration manager associated with the device, if the device is in the configuration lockdown mode.

11. The apparatus of claim 8, wherein the one or more automated actions comprise one or more of generating a configuration lockdown alert and disabling the device.

12. A non-transitory processor-readable storage medium having stored therein program code of one or more software programs, wherein the program code when executed by at least one processing device causes the at least one processing device to perform the following steps:
   receiving a configuration command from a user to modify a configuration of at least a portion of a device;
   in response to receiving the configuration command, performing the following steps:
   determining whether the device is in a configuration lockdown mode that limits an execution of one or more configuration commands, wherein the received configuration command is distinct from a command to enable the configuration lockdown mode, wherein a duration of a disabling of the configuration lockdown mode is limited by one or more duration limits;
   executing the received configuration command in response to determining that the device is not in the configuration lockdown mode and that the one or more duration limits are not violated; and
   performing one or more automated actions and rejecting the received configuration command in response to determining that the device is in the configuration lockdown mode.

13. The non-transitory processor-readable storage medium of claim 12, further comprising querying a configuration manager associated with the device to obtain the one or more duration limits for the configuration lockdown mode.

14. The non-transitory processor-readable storage medium of claim 12, further comprising determining, by a configuration manager associated with the device, if the device is in the configuration lockdown mode.

15. The non-transitory processor-readable storage medium of claim 12, further comprising evaluating one or more of credentials of the user and permissions of the user to execute the configuration command.

16. The method of claim 1, wherein the configuration lockdown mode limits the execution of one or more configuration commands during the configuration lockdown mode to only one or more authorized users, wherein an authorization of a given user is based on a role of the given user within an organization, and wherein the one or more automated actions are performed in response to further determining that the received configuration command is from an unauthorized user.

17. The method of claim 1, wherein the device is automatically placed in the configuration lockdown mode by default.

18. The apparatus of claim 9, further comprising evaluating credentials of the user.

19. The apparatus of claim 8, wherein the device is automatically placed in the configuration lockdown mode by default.

20. The non-transitory processor-readable storage medium of claim 13, further comprising evaluating credentials of the user.

\* \* \* \* \*